United States Patent
Cheng et al.

(10) Patent No.: US 9,541,699 B2
(45) Date of Patent: Jan. 10, 2017

(54) BACKLIGHT MODULE WITH LIGHT CONVERSION LAYER

(71) Applicants: Kai-Hung Cheng, Hsin-Chu (TW); Chia-Hung Yu, Hsin-Chu (TW)

(72) Inventors: Kai-Hung Cheng, Hsin-Chu (TW); Chia-Hung Yu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 84 days.

(21) Appl. No.: 14/613,368

(22) Filed: Feb. 4, 2015

(65) Prior Publication Data

US 2015/0331170 A1 Nov. 19, 2015

(30) Foreign Application Priority Data

May 13, 2014 (CN) .......................... 2014 1 0201041

(51) Int. Cl.
*F21V 8/00* (2006.01)
*G02F 1/1333* (2006.01)
*G02F 1/355* (2006.01)
*G02F 1/1335* (2006.01)

(52) U.S. Cl.
CPC .............. *G02B 6/005* (2013.01); *G02B 6/0026* (2013.01); *G02B 6/0031* (2013.01); *G02B 6/0091* (2013.01); *G02F 1/133308* (2013.01); *G02F 1/3556* (2013.01); *G02F 2001/133614* (2013.01)

(58) Field of Classification Search
CPC ..... G02B 6/005; G02B 6/0051; G02B 6/0053; G02B 6/0055; G02B 6/0056; G02B 6/0058; G02B 6/0025; G02B 6/0031
USPC .................................................. 362/607–608
See application file for complete search history.

(56) References Cited

U.S. PATENT DOCUMENTS

| | | | | |
|---|---|---|---|---|
| 9,074,748 B2* | 7/2015 | Yang | .......................... | G02B 6/42 |
| 9,075,176 B2* | 7/2015 | Iwasaki | ................ | G02B 6/0041 |
| 9,198,258 B2* | 11/2015 | Kim | .................. | G02F 1/133512 |
| 2005/0200770 A1* | 9/2005 | Kuo | ...................... | G02B 6/0055 349/58 |
| 2010/0283072 A1* | 11/2010 | Kazlas | .................. | G02B 6/005 257/98 |
| 2013/0335677 A1 | 12/2013 | You | | |
| 2015/0109816 A1* | 4/2015 | Yagi | ...................... | G02B 6/0023 362/606 |

FOREIGN PATENT DOCUMENTS

TW 201318961 5/2013

\* cited by examiner

*Primary Examiner* — Robert May
(74) *Attorney, Agent, or Firm* — Jianq Chyun IP Office

(57) ABSTRACT

A backlight module including a back plate, a light guide plate, a light source, a plastic frame, and a light conversion layer is provided. The light guide plate is disposed on the back plate and has a light incident surface and a light exit surface, wherein a first edge of the light exit surface is adjacent to the light incident surface. The light source is disposed on the back plate and faces the light incident surface. The plastic frame is disposed on the back plate and covers the first edge. The light conversion layer is disposed on the light exit surface and extends to the first edge.

9 Claims, 3 Drawing Sheets

BACKLIGHT MODULE WITH LIGHT CONVERSION LAYER

CROSS-REFERENCE TO RELATED APPLICATION

This application claims the priority benefit of China application serial no. 201410201041.7, filed on May 13, 2014. The entirety of the above-mentioned patent application is hereby incorporated by reference herein and made a part of this specification.

BACKGROUND OF THE INVENTION

Field of the Invention

The invention relates to an optical module, and more particularly relates to a backlight module.

Description of Related Art

Quantum dots are semiconductor nanocrystals that are extremely small and invisible to naked human eyes. A characteristic of quantum dots is that the quantum dots emit colored light when receiving light stimulation, and the color of the light is determined by the material and size/shape of the quantum dots. Because of this characteristic, quantum dots are capable of changing the color of the light emitted by a light source. In recent years, quantum dot polymer composite material has been widely used in areas such as backlighting and illumination.

Take the quantum dot enhanced films (QDEF) developed by Nanosys Inc. and 3M Company as examples, the quantum dot enhanced films are applicable to the backlight module of a display device such that the display device provides images of wide color gamut and high color saturation. The quantum dot enhanced film is disposed on the light exit surface of the light guide plate in place of a diffusion sheet for converting a large portion of the blue light emitted by the blue light emitting diode (LED) to red light and green light, and the blue light, red light, and green light are mixed into white light that the display device requires for displaying images. However, according to this light emitting method, blue flare may easily occur at edge regions of the display surface of the display device and affect the display quality. Moreover, the blue light leaked from the edge regions of the display panel may result in macular degeneration of the user's eyes.

Taiwan Patent No. TW201318961A1 discloses a liquid crystal display, in which a light conversion sheet is disposed on the light guide plate for converting the blue light emitted by the blue light emitting diode to red light and green light. US Patent Publication No. US20130335677A1 discloses a display device, in which a color separation film is disposed on the quantum dot enhanced film for recycling the blue light emitted by the blue light emitting diode.

The information disclosed in this Description of Related Art section is only for enhancement of understanding of the background of the described technology and therefore it may contain information that does not form the prior art that is already known to a person of ordinary skill in the art. Further, the information disclosed in the Description of Related Art section does not mean that one or more problems to be resolved by one or more embodiments of the invention was acknowledged by a person of ordinary skill in the art.

SUMMARY OF THE INVENTION

The invention provides a backlight module for preventing blue flare that may occur at an edge region of a display surface of a display device.

Other features and advantages of the embodiments of the invention are illustrated by the technical features broadly embodied and described as follows.

In view of one, part of, or all of the aforementioned or other features, an embodiment of the invention provides a backlight module that includes a back plate, a light guide plate, a light source, a plastic frame, and a light conversion layer. The light guide plate is disposed on the back plate and has a light incident surface and a light exit surface, wherein a first edge of the light exit surface is adjacent to the light incident surface. The light source is disposed on the back plate and faces the light incident surface. The plastic frame is disposed on the back plate and covers the first edge. The light conversion layer is disposed on the light exit surface and extends to the first edge.

In the backlight module of an embodiment of the invention, the light source is a blue light source, and the light conversion layer is a quantum dot enhanced film (QDEF).

The backlight module of an embodiment of the invention further includes at least one first reflective layer, wherein the first reflective layer is close to the first edge, and is disposed between the light exit surface and the light conversion layer and extends to the first edge of the light guide plate.

In the backlight module of an embodiment of the invention, the light conversion layer includes a main body portion, a peripheral portion, and a bent portion. The bent portion is connected between the main body portion and the peripheral portion. The peripheral portion is protruded from the first edge of the light guide plate. The main body portion is in contact with the light exit surface. A gap exists between the peripheral portion and the light exit surface, and the first reflective layer is disposed between the peripheral portion and the light exit surface.

The backlight module of an embodiment of the invention further includes at least one second reflective layer, wherein the second reflective layer is close to the first reflective layer and is disposed between the main body portion and the plastic frame.

In the backlight module of an embodiment of the invention, the light conversion layer is protruded from the first edge towards the light source and is partially disposed outside the light guide plate.

In the backlight module of an embodiment of the invention, the light conversion layer is aligned with the first edge of the light guide plate.

In the backlight module of an embodiment of the invention, the light guide plate includes a side surface. The side surface is opposite to the light incident surface and is adjacent to a second edge of the light exit surface. The plastic frame covers the second edge. The light conversion layer extends to the second edge.

In the backlight module of an embodiment of the invention, the light conversion layer is protruded from the second edge to the outside of the light guide plate.

In the backlight module of an embodiment of the invention, the light conversion layer is aligned with the second edge of the light guide plate.

The backlight module of an embodiment of the invention further includes at least one third reflective layer, wherein the third reflective layer is close to the second edge, and is disposed between the light conversion layer and the plastic frame and extends to the second edge of the light guide plate.

Based on the above, the embodiments of the invention have at least one of the following advantages. In the above embodiments of the invention, the light conversion layer disposed on the light exit surface of the light guide plate extends to the edge of the light exit surface and therefore has a larger extension area and covers the light exit surface completely. Accordingly, the light that enters the light guide plate from the light source is effectively converted by the light conversion layer. Thus, unexpected flare that may occur in the edge region of the display surface of the display device is prevented to improve the display quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
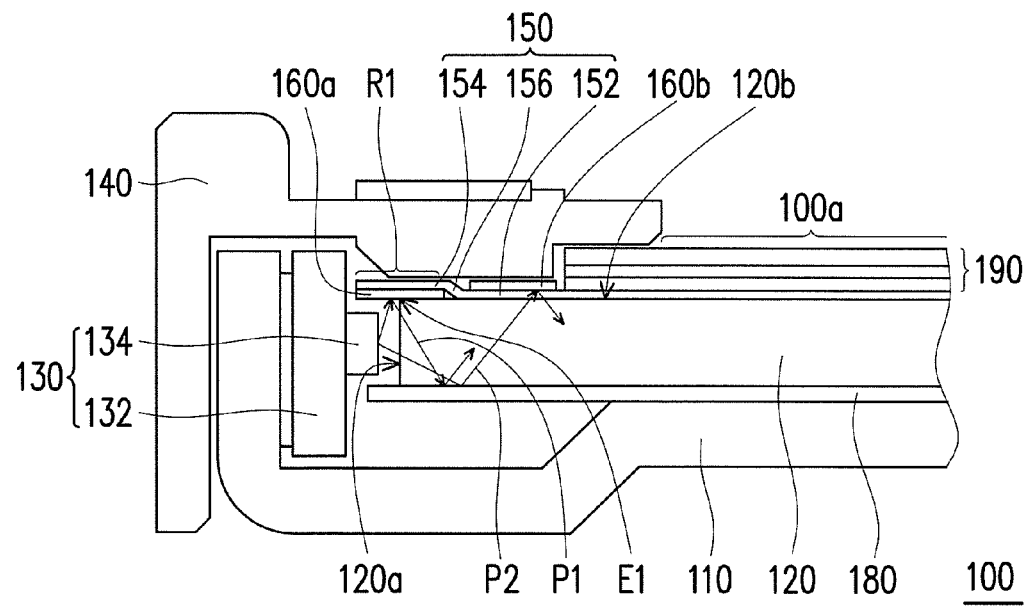
FIG. 1 is a schematic partial view of a backlight module according to an embodiment of the invention.
Figure 2:
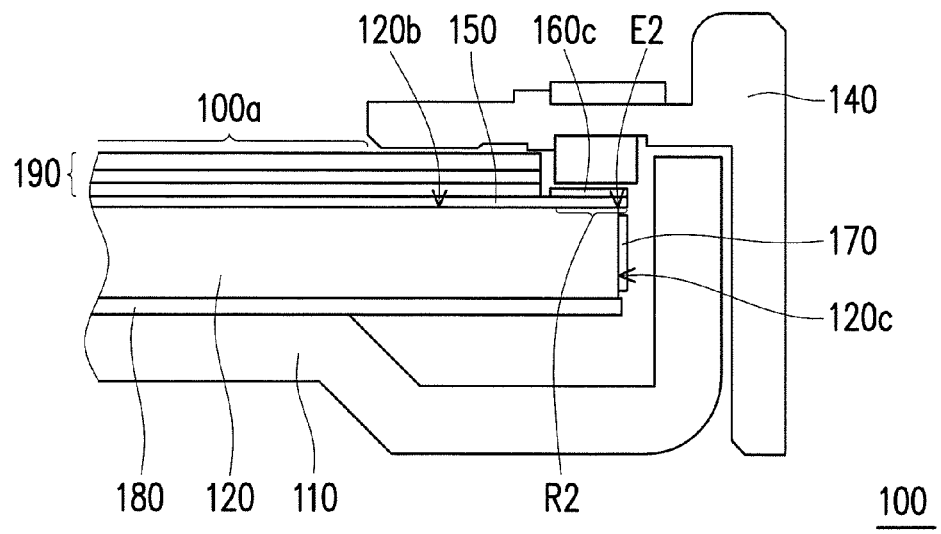
FIG. 2 is another schematic partial view of the backlight module of FIG. 1.

FIG. 1 is a schematic partial view of a backlight module according to an embodiment of the invention. FIG. 2 is another schematic partial view of the backlight module of FIG. 1. With reference to FIG. 1 and FIG. 2, a backlight module 100 of this embodiment includes a back plate 110, a light guide plate 120, a light source 130, a plastic frame 140, a light conversion layer 150, a reflective sheet 170 (shown in FIG. 2), a reflective sheet 180, and an optical film set 190. The light guide plate 120 is disposed on the back plate 110 and has a light incident surface 120a, a light exit surface 120b, and a side surface 120c (shown in FIG. 2), wherein the side surface 120c and the light incident surface 120a are opposite to each other. The plastic frame 140 is disposed on the back plate 110. The reflective sheet 170 is disposed on the side surface 120c of the light guide plate 120. The reflective sheet 180 is disposed between the back plate 110 and the light guide plate 120. The light conversion layer 150 is a quantum dot enhanced film (QDEF), for example, and is disposed on the light exit surface 120b of the light guide plate 120. The optical film set 190 is disposed on the light conversion layer 150.

The light source 130 is disposed on the back plate 110 and faces the light incident surface 120a of the light guide plate 120, wherein the light source 130 is a blue light source, for example, and includes a substrate 132 and a blue light emitting diode (LED) element 134 disposed on the substrate 132. After a blue light emitted by the light source 130 enters the light guide plate 120 through the light incident surface 120a, the blue light is transmitted in the light guide plate 120 by total reflection of the light guide plate 120 and through the reflective sheet 170 and the reflective sheet 180, and then passes through the light exit surface 120b and reaches the light conversion layer 150 to be partially converted to a red light and a green light by the light conversion layer 150. The blue light, the red light, and the green light are mixed into a white light to be emitted through the optical film set 190.

In this embodiment, the light exit surface 120b of the light guide plate 120 has a first edge E1 (shown in FIG. 1) and a second edge E2 (shown in FIG. 2) opposite to the first edge E1. The first edge E1 is adjacent to the light incident surface 120a and is covered by the plastic frame 140. The second edge E2 is adjacent to the side surface 120c and is covered by the plastic frame 140. The light conversion layer 150 is protruded from the first edge E1 of the light exit surface 120b and extends to the second edge E2 of the light exit surface 120b, and has a larger extension area than the optical film set 190 to completely cover the light exit surface 120b, such that the blue light that enters the light guide plate 120 from the light source 130 is effectively converted by the light conversion layer 150. Accordingly, when the backlight module 100 of this embodiment is applied to a display device, unexpected blue flare that may occur at the edge region of a display surface of the display device is prevented to improve the display quality and avoid causing an illness of the user's eyes due to the blue flare.

More specifically, quantum dots at the periphery of the light conversion layer 150 (the quantum dot enhanced film) may easily lose light conversion capability due to cutting, resulting in a failure region R1 as shown in FIG. 1 and a failure region R2 as shown in FIG. 2 at the periphery of the light conversion layer 150. Considering the above, in this embodiment, the light conversion layer 150 extends to the first edge E1 and the second edge E2 of the light exit surface 120b of the light guide plate 120, as described above, so as to keep the failure region R1 and the failure region R2 of the light conversion layer 150 away from a light exit region 100a of the backlight module 100, thereby preventing the blue light, which passes through the failure region R1 and the failure region R2 without being converted to the red light and green light, from reaching the light exit region 100a directly to cause blue flare.

To be more specific, the light conversion layer 150 of this embodiment includes a main body portion 152, a peripheral portion 154, and a bent portion 156, as shown in FIG. 1. The bent portion 156 is connected between the main body portion 152 and the peripheral portion 154. The main body portion 152 is in contact with the light exit surface 120b of the light guide plate 120 and at least covers the light exit region 100a of the backlight module 100. The peripheral portion 154 is protruded from the first edge E1 of the light exit surface 120b of the light guide plate 120. A gap exists between the peripheral portion 154 and the light exit surface 120b of the light guide plate 120. The backlight module 100 further includes at least one first reflective layer 160a. The first reflective layer 160a is close to the first edge E1 and is disposed at the gap between the peripheral portion 154 of the light conversion layer 150 and the light exit surface 120b of the light guide plate 120, wherein the first reflective layer 160a extends to the first edge E1 and is protruded toward the light source 130 from the first edge E1 of the light guide plate 120, such that the blue light emitted by the light source 130 (as indicated by a light path P1) is reflected into the light guide plate 120 by the first reflective layer 160a to ensure that the blue light does not exit directly without entering the light guide plate 120. Therefore, blue flare does not occur at the edge of the light exit region 100a.

The backlight module 100 of this embodiment further includes at least one second reflective layer 160b, as shown in FIG. 1, and at least one third reflective layer 160c, as shown in FIG. 2. The second reflective layer 160b is close to the first reflective layer 160a and is disposed between the main body portion 152 and the plastic frame 140. The third reflective layer 160c is close to the second edge E2 of the light exit surface 120b of the light guide plate 120, and is disposed between the light conversion layer 150 and the plastic frame 140. The third reflective layer 160c extends to the second edge E2 of the light exit surface 120b of the light guide plate 120. The blue light that enters the light guide plate 120 from the light source 130 and travels to the light conversion layer 150 (as indicated by a light path P2) is reflected by the second reflective layer 160b and the third reflective layer 160c more times to ensure that the number of times that the blue light passes through the light conversion layer 150 is sufficient to successfully convert the blue light to the red light or green light.

The first reflective layer 160a, the second reflective layer 160b, and the third reflective layer 160c of this embodiment are reflective sheets that are fixed by glue bonding, for example. However, the invention is not limited thereto. In other embodiments, the first reflective layer 160a, the second reflective layer 160b, and the third reflective layer 160c may be formed by an ink printing process. In addition, the first reflective layer 160a, the second reflective layer 160b, and the third reflective layer 160c of this embodiment are single-layer reflective layers, for example. However, the invention is not limited thereto. In other embodiments, the first reflective layer 160a, the second reflective layer 160b, and the third reflective layer 160c may be multi-laminated-layer reflective layers according to the requirements of design.

Figure 3:
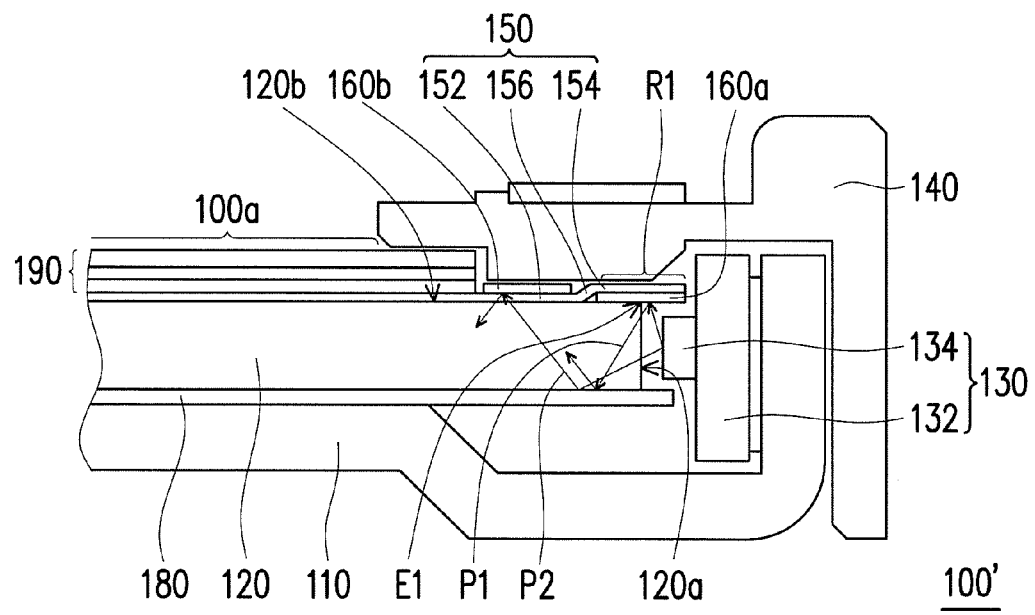
FIG. 3 is a schematic partial view of a backlight module according to another embodiment of the invention.

In the backlight module 100 of the above embodiment, the light source 130 is disposed at only one side of the light guide plate 120, which is a single-sided light incidence type. However, the invention is not limited thereto. The backlight module 100' may also be a double-sided light incidence type, which is explained below with reference to FIG. 3. FIG. 3 is a schematic partial view of a backlight module according to another embodiment of the invention. In this embodiment, the light guide plate 120 of a backlight module 100' has two opposite light incident surfaces 120a, and the light source 130 is disposed beside each of the light incident surfaces 120a. The light sources 130 are disposed symmetrically with respect to the light guide plate 120, so that the backlight module 100' is the double-sided light incidence type. FIG. 3 and FIG. 1 are symmetrical to each other and have elements or features with the same reference numerals. Thus, the configurations and operations are the same or similar and will not be repeated hereinafter.

In the embodiments shown in FIG. 1 and FIG. 2, the light conversion layer 150 is protruded from the first edge E1 of the light guide plate 120 and extends towards the light source 130. The light conversion layer 150 is located partially outside the light guide plate 120 as shown in FIG. 1. The light conversion layer 150 is protruded from the second edge E2 of the light guide plate 120 to the outside of the light guide plate 120 as shown in FIG. 2, so as to ensure that a sufficient distance is maintained respectively between the failure region R1 and the failure region R2 of the light conversion layer 150 and light exit region 100a of the backlight module 100, such that the light conversion layer 150 effectively converts the blue light emitted by the light source 130. However, the invention is not limited thereto. The light conversion layer 150 may be not protruded to the outside of the light guide plate 120 according to the requirements of design, which is explained below with reference to the accompanying figures.

Figure 4:
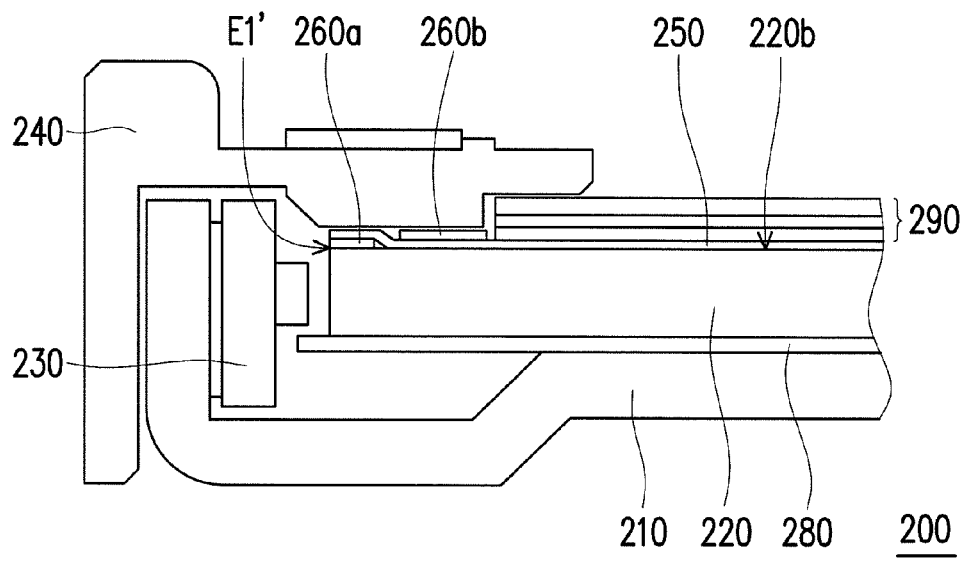
FIG. 4 is a schematic partial view of a backlight module according to another embodiment of the invention.
Figure 5:
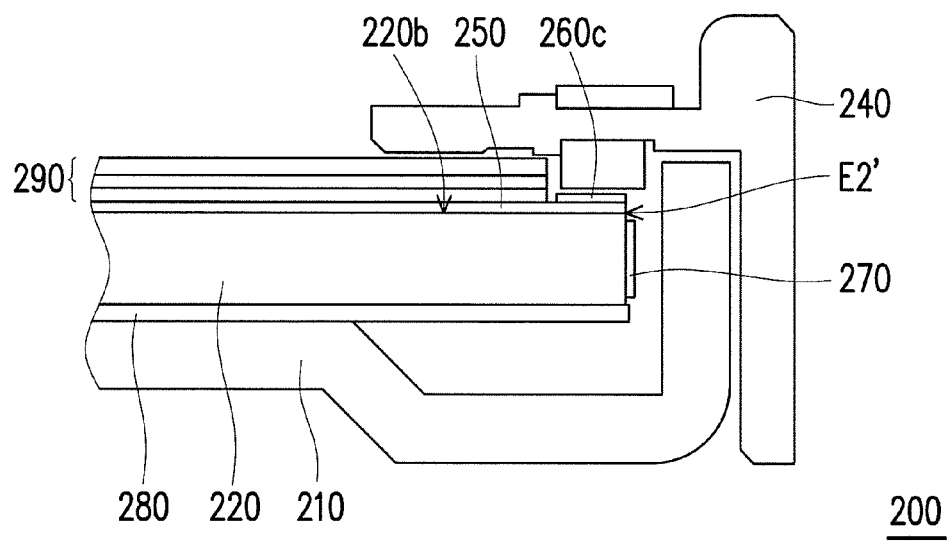
FIG. 5 is another schematic partial view of the backlight module of FIG. 4.

FIG. 4 is a schematic partial view of a backlight module according to another embodiment of the invention. FIG. 5 is another schematic partial view of the backlight module of FIG. 4. With reference to FIG. 4 and FIG. 5, in a backlight module 200 of this embodiment, a back plate 210, a light guide plate 220, a light source 230, a plastic frame 240, a light conversion layer 250, a first reflective layer 260a, a second reflective layer 260b, a third reflective layer 260c, a reflective sheet 270 (shown in FIG. 5), a reflective sheet 280, and an optical film set 290 are disposed and operate in a manner similar to that shown in FIG. 1 and FIG. 2. Thus, details thereof are not repeated hereinafter. A difference between the backlight module 200 and the backlight module 100 is that: the light conversion layer 250 is aligned with a first edge E1' of a light exit surface 220b of the light guide plate 220, and the light conversion layer 250 is aligned with a second edge E2' of the light exit surface 220b of the light guide plate 220, such that the light conversion layer 250 is not protruded to the outside the light guide plate 220.

Figure 6:
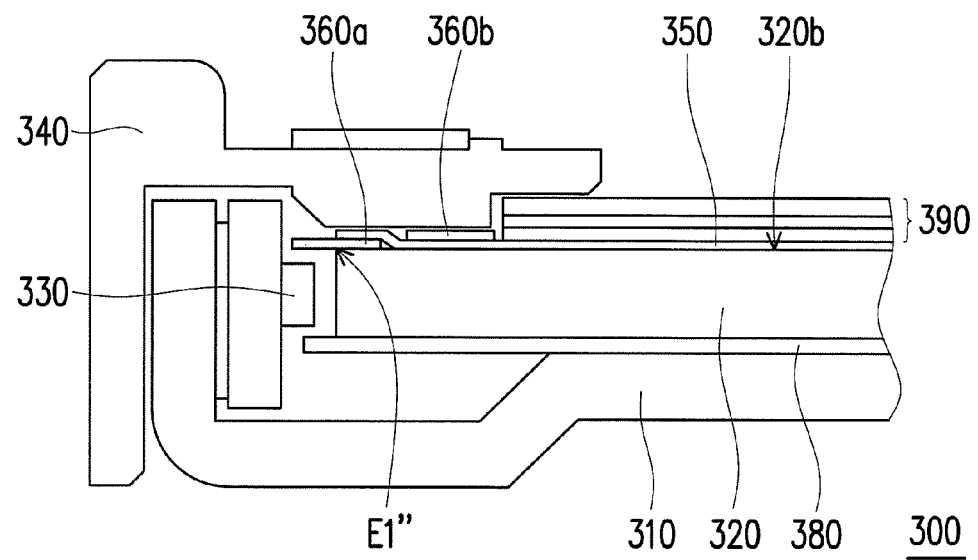
FIG. 6 is a schematic partial view of a backlight module according to another embodiment of the invention.

FIG. 6 is a schematic partial view of a backlight module according to another embodiment of the invention. In a backlight module 300 of FIG. 6, a back plate 310, a light guide plate 320, a light source 330, a plastic frame 340, a light conversion layer 350, a first reflective layer 360a, a second reflective layer 360b, a reflective sheet 380, and an optical film set 390 are disposed and operate in a manner similar to that shown in FIG. 1. Thus, details thereof are not repeated hereinafter. A difference between the backlight module 300 and the backlight module 100 is that: only the first reflective layer 360a is protruded from a first edge E1" of a light exit surface 320b of the light guide plate 320 to the outside of the light guide plate 320, and the light conversion layer 350 is aligned with the first edge E1" of the light exit surface 320b of the light guide plate 320, such that the light conversion layer 350 is not protruded to the outside the light guide plate 320.

In conclusion of the above, the embodiments of the invention have at least one of the following advantages. In the above embodiments of the invention, the light conversion layer disposed on the light exit surface of the light guide plate is protruded from the edge of the light exit surface and thus has a larger extension area to cover the light exit surface completely. Accordingly, the failure region at the periphery of the light conversion layer is farther away from the light exit region of the backlight module, so that the light that enters the light guide plate from the light source is effectively converted by the light conversion layer. When the backlight module is applied to the display device, unexpected blue flare that may occur at the edge region of the display surface of the display device is prevented to improve the display quality and to avoid causing illness of the user's eyes due to the blue flare. Moreover, the reflective layers are disposed between the peripheral portion of the light conversion layer and the light exit surface of the light guide plate for reflecting the blue light emitted by the light source into the light guide plate, so as to improve the light utilization efficiency of the backlight module. Further, the reflective layers may be disposed between the light conversion layer and the plastic frame, so that the blue light transmitted to the light conversion layer is reflected by the reflective layers more times to ensure that the number of times the blue light passes through the light conversion layer is sufficient for successfully converting the blue light to the red light and green light.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising a back plate, a light guide plate, a light source, a plastic frame, a light conversion layer, and at least one first reflective layer, wherein:
   the light guide plate is disposed on the back plate and has a light incident surface and a light exit surface, wherein a first edge of the light exit surface is adjacent to the light incident surface;
   the light source is disposed on the back plate and faces the light incident surface;
   the plastic frame is disposed on the back plate and covers the first edge;
   the light conversion layer is disposed on the light exit surface and extends to the first edge;
   the first reflective layer is close to the first edge, and is disposed between the light exit surface and the light conversion layer and extends to the first edge of the light guide plate; and
   the light conversion layer comprises a main body portion, a peripheral portion, and a bent portion, wherein the bent portion is connected between the main body portion and the peripheral portion, the peripheral portion extends to the first edge of the light guide plate, the main body portion is in contact with the light exit surface, a gap exists between the peripheral portion and the light exit surface, and the first reflective layer is disposed between the peripheral portion and the light exit surface.

2. The backlight module according to claim 1, wherein the light source is a blue light source, and the light conversion layer is a quantum dot enhanced film (QDEF).

3. The backlight module according to claim 1, further comprising at least one second reflective layer, wherein the second reflective layer is close to the first reflective layer and is disposed between the main body portion and the plastic frame.

4. The backlight module according to claim 1, wherein the light conversion layer is protruded from the first edge towards the light source and is partially disposed outside the light guide plate.

5. The backlight module according to claim 1, wherein the light conversion layer is aligned with the first edge of the light guide plate.

6. The backlight module according to claim 1, wherein the light guide plate comprises a side surface, the side surface is opposite to the light incident surface and is adjacent to a second edge of the light exit surface, the plastic frame covers the second edge, and the light conversion layer extends to the second edge.

7. The backlight module according to claim 6, wherein the light conversion layer is protruded from the second edge to the outside of the light guide plate.

8. The backlight module according to claim 6, wherein the light conversion layer is aligned with the second edge of the light guide plate.

9. The backlight module according to claim 6, further comprising at least one third reflective layer, wherein the third reflective layer is close to the second edge, and is disposed between the light conversion layer and the plastic frame and extends to the second edge of the light guide plate.

\* \* \* \* \*